(No Model.)
J. F. FOSS.
MECHANICAL MOVEMENT.
No. 316,136. Patented Apr. 21, 1885.
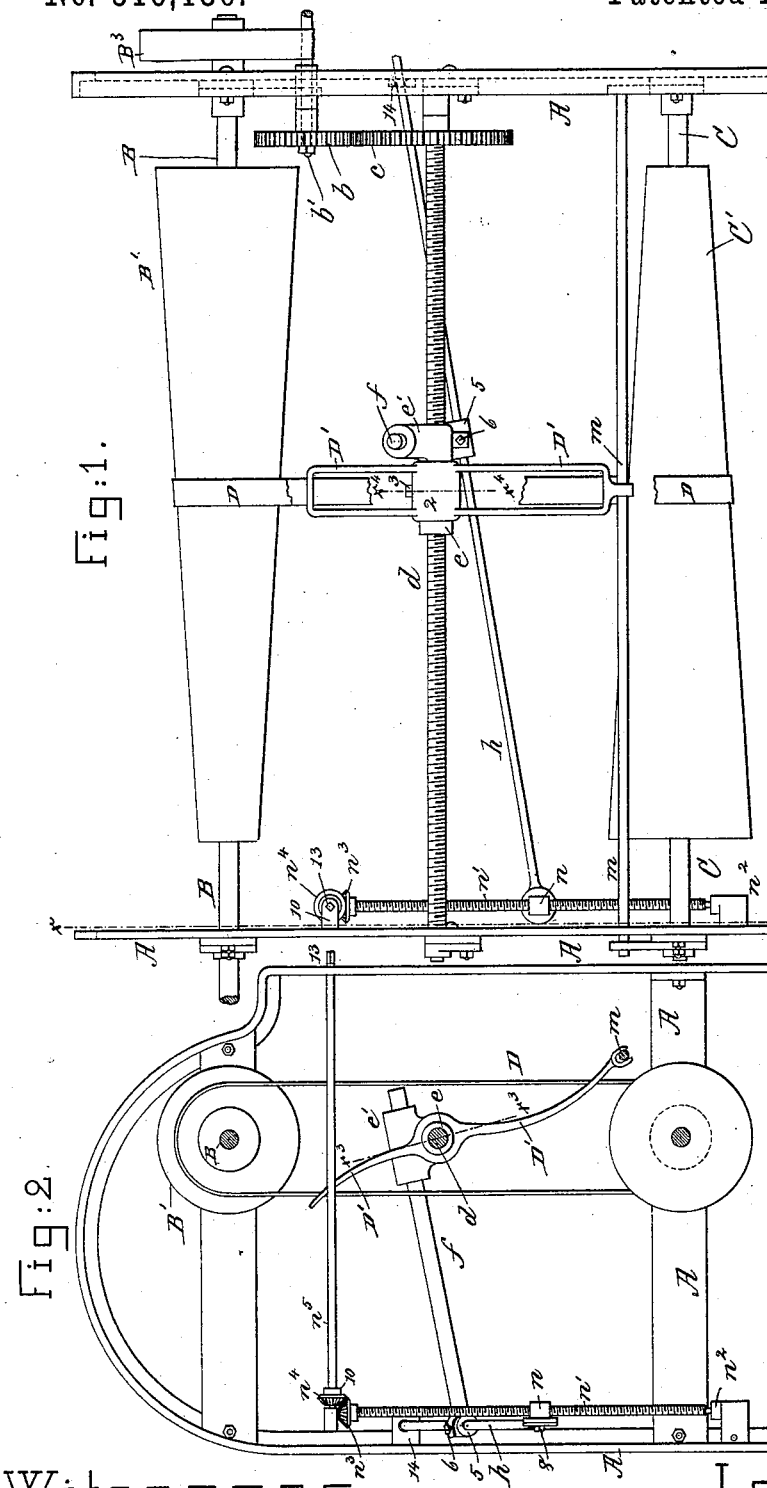
Witnesses.
Arthur Zipperlen.
Fred L. Emery.
Inventor.
John F. Foss,
by Crosby & Gregory Atty.

UNITED STATES PATENT OFFICE.

JOHN F. FOSS, OF TEWKSBURY, ASSIGNOR TO THE HOPEDALE MACHINE COMPANY, OF HOPEDALE, MASSACHUSETTS.

MECHANICAL MOVEMENT.

SPECIFICATION forming part of Letters Patent No. 316,136, dated April 21, 1885.

Application filed March 9, 1885. (No model.)

*To all whom it may concern:*

Be it known that I, JOHN F. FOSS, of Tewksbury, county of Middlesex, State of Massachusetts, have invented an Improvement in Mechanical Movements, of which the following description, in connection with the accompanying drawings, is a specification, like letters on the drawings representing like parts.

This invention relates to a mechanical movement, especially applicable for use in connection with belt-shipping mechanism containing cone-pulleys, on which the belt is shifted to effect a gradual increase or decrease in the speed of the driven cone-pulley and the devices set in motion by it. In all such mechanism heretofore devised and known to me the speed of movement of the belt being shipped depends upon a screw, chain, or rack and pinion; but the speed at which the belt-shipper traverses is uniform and cannot be varied in degree with relation to that of the driving mechanism, except by a change of gearing.

The object of my invention is to provide means whereby a belt-shipper driven by a screw may, if desired, be moved in the direction of the length of the screw at a speed differing from that of the screw, thus obviating stopping the machine, removing gearing, and substituting other gearing therefor. As a mechanical movement I am enabled to impart to the belt-shipper driven by a screw entering its hub a speed differing from that indicated by the pitch of the screw.

Figure 1 in elevation represents a mechanism which illustrates a practical embodiment of my improvements, the same being shown as applied to a machine used in the manufacture of yarn. Fig. 2 is section of Fig. 1 on the dotted line $xx$, looking toward the right. Figs. 3, 4, and 5 are details in explanation of my invention and to be referred to, Figs. 3 and 5 being partial sections in the lines $x^3$ $x^4$.

The frame-work A has suitable boxes to sustain the shaft B, on which is mounted the uniformly-rotating driving cone-pulley B', driven at a uniform speed by means of a belt on the pulley $B^3$. The shaft $b'$ has a pinion, $b$, which takes into a toothed wheel or gear, $c$, fast on the shaft of the uniformly-threaded screw $d$, mounted in suitable boxes on the frame-work. The frame-work has boxes to sustain the shaft C, having on it the driven cone-pulley C', the speed of which is increased or decreased according to the direction of movement of the belt D connecting the said two pulleys, as the said belt is acted upon by the belt-shipper D', of usual construction, the hub 2 of which is mounted on the sleeve-like nut $e$, which in turn is mounted on the screw $d$, one end of a screw or other pin, 3, in the hub of the shipper entering a diagonal slot in the said sleeve-like nut. The sleeve-like nut has a hollow head or ear, $e'$, at right angles to it, and the said head receives through it loosely a nut-rocking device, $f$, shown as a rod, the latter being attached at its rear end to the speed-varying guide $h$, the said rod $f$, as herein shown, being bored to embrace a hub or collar, 5, placed loosely on the said guide, the connection between the rod and collar or hub being by the screws 6 6. The lower end of the belt-shipper is forked to travel on the shipper-guiding rod $m$.

The speed-varying guide is shown as a round rod, $h$, one end of which is pivoted by a bolt, 8, on a nut, $n$, mounted on a screw, $n'$, having one end stepped at $n^2$, and provided at its upper end with a bevel-gear, $n^3$, which is engaged by a bevel-gear, $n^4$, on a shaft, $n^5$, held in bearings 10 10, the said shaft being squared, as at 13, to receive a handle or key by which to turn it to actuate the screw $n'$, and raise or lower the nut $n$, or place it more or less distant from the screw $d$, and as the other end of the guide $h$ is held loosely in a hole in an ear, 14, of the frame, it follows that adjustment of the nut places the said guide in a more or less angular position with relation to the axis of the screw $d$.

The shaft B will in practice be extended to the left of the frame-work, and may be employed to drive other devices at one speed, and the shaft C, prolonged in the same direction, may be employed to drive other devices at a speed varying from that of the shaft B.

My improvement is especially applicable, among other things, to speeders and fly-frames, wherein the fliers are driven at a uniform speed and the bobbins at a gradually increasing or decreasing speed as the roving thereon increases in diameter. My improvements are advantageous when different-sized bobbins are used and to accommodate for variation in yarn or stock and also in changes in atmospheric condition of the mill.

The hub or collar 5, loose on the guide h, is caused to travel thereon in unison with the movement of the sleeve-like nut e by the screw d, and as the hub or collar slides on the said guide toward its lower end the rod connected with the said hub or collar will act to partially rotate the sleeve-like nut e on the screw d in the direction of the arrow near it in Fig. 5, which will cause the walls of the spiral or inclined slot 4 of the nut to act on the screw or stud 3 of the hub of the belt-fork D', causing the same to be started slightly forward on the hub e for a distance in excess of the movement caused by the screw d equal to the increase of the pitch of the inclined slot 4 as compared with the pitch of the thread of the screw d. Movement of the belt D on the driven cone-pulley C' toward its largest end decreases the speed of the shaft C relatively to the shaft B, and it will therefore be understood that the greater the divergence from parallelism of the screw d and the guide h the greater the movement of the belt shipper or fork in excess of the movement which would be derived from the screw d alone. Inclining the rod H in the opposite direction would enable the belt-shipper to be moved horizontally for a less distance than the sleeve e'.

I claim—

1. The driving-shaft B, the driving cone-pulley B' thereon, the shaft C and driven cone-pulley thereon, the belt-shipper fork D' to control the belt D, connecting the said two cone-pulleys, a screw, and means to rotate it and the sleeve-nut, and means to connect the hub of the belt-shipper loosely therewith, combined with a speed-varying guide and means between it and the said nut e to effect the partial rotation of the said nut on the screw d independent of the movement given to the said nut by the said screw, whereby the speed of the shipper is made variable, substantially as described.

2. The driving-shaft B, the driving cone-pulley thereon, the shaft C and driven cone-pulley thereon, the belt-shipper fork D', to control the belt D, connecting the said two cone-pulleys, a screw, and means to rotate it and the sleeve-like nut e, and means to connect the hub of the belt-shipper loosely therewith, combined with a speed-varying guide, and means between it and the said nut e to effect the further rotation of the said nut on the screw d independent of the movement given to the said nut by the said screw, and with means to vary the position of the said guide, to operate all substantially as described.

3. A rotating driving-cone, a cone driven by it, the belt to connect the said cones, the belt-shipper, and the rotating screw-threaded shaft on which it is arranged to travel at uniform speed, combined with means, substantially as described, for traversing said shipper faster or slower than it would be traversed by said screw-shaft, as set forth.

In testimony whereof I have signed my name to this specification in the presence of two subscribing witnesses.

JOHN F. FOSS.

Witnesses:
FRANK J. DUTCHER,
GEO. A. DRAPER.